Sept. 5, 1967
R. E. RIEBS
3,340,434
DISTANCE RELAY
Filed Jan. 21, 1965
3 Sheets-Sheet 1
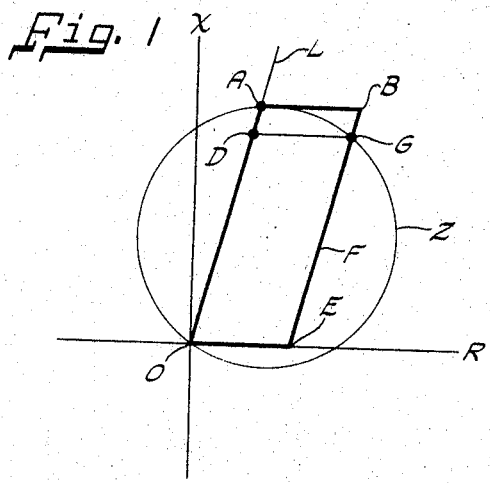
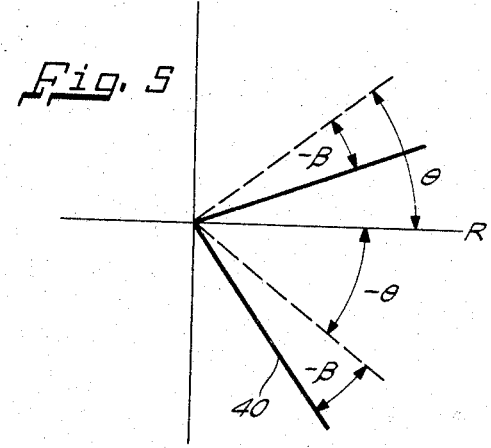
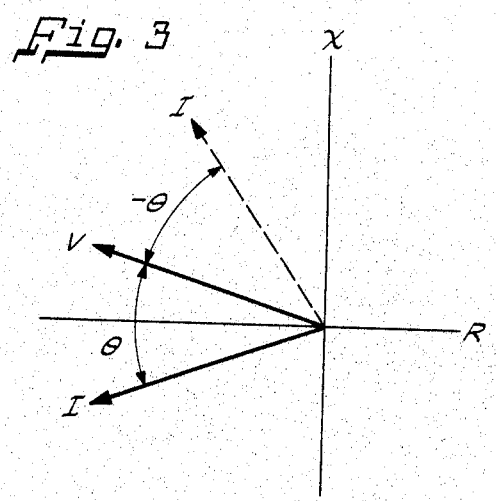
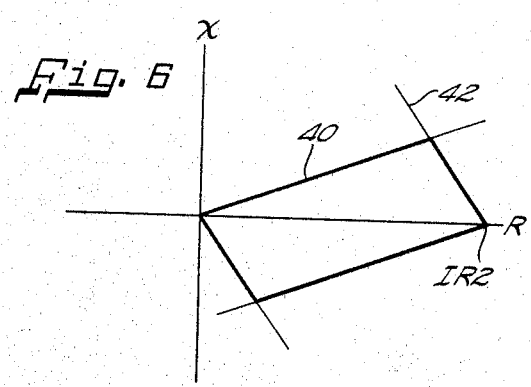
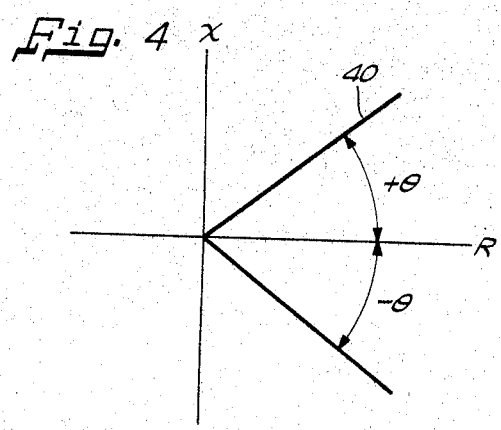
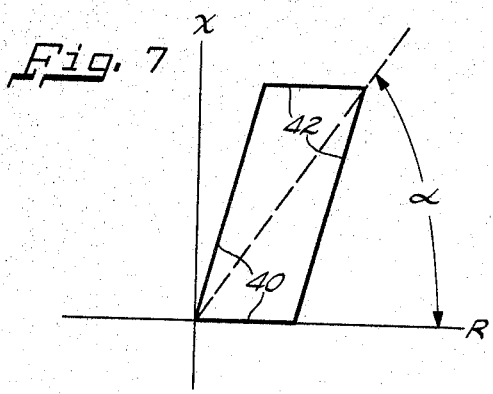
INVENTOR.
Richard E. Riebs
BY Fred Wiviott
Attorney INVENTOR.
Richard E. Riebs
BY Fred Wirrott
Attorney Sept. 5, 1967 R. E. RIEBS 3,340,434
DISTANCE RELAY
Filed Jan. 21, 1965 3 Sheets-Sheet 3
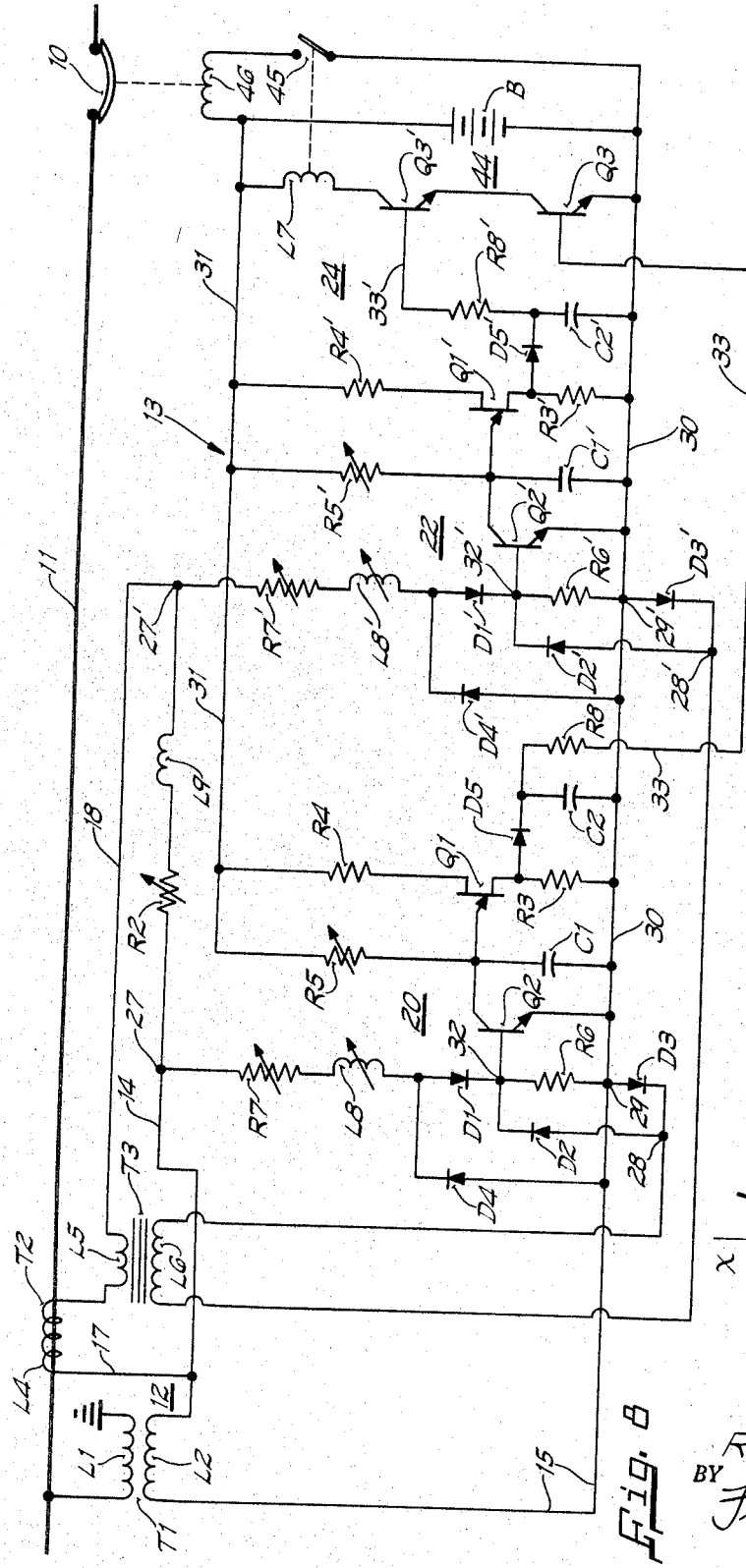
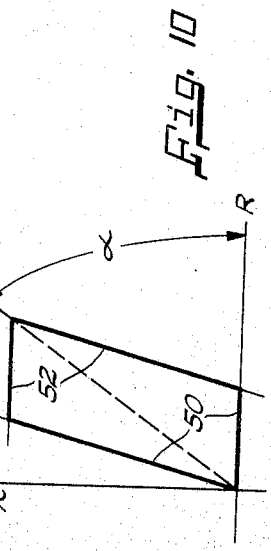
Fig. 10
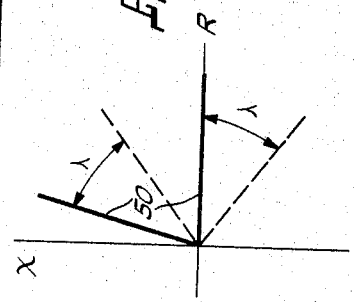
Fig. 9
INVENTOR.
Richard E. Riebs
BY
Fred Wirrott
Attorney United States Patent Office 3,340,434
Patented Sept. 5, 1967

3,340,434
DISTANCE RELAY
Richard E. Riebs, Hales Corners, Wis., assignor to McGraw-Edison Company, Milwaukee, Wis., a corporation of Delaware
Filed Jan. 21, 1965, Ser. No. 426,739
20 Claims. (Cl. 317—36)

This invention relates to protective devices for electric power systems and, more particularly, to a distance type relay for use in such systems and which is capable of discriminating between actual line faults and power swings.

A distance relay is a protective device which operates in response to the apparent impedance of the circuit being protected. Under normal operating conditions, the apparent impedance of the protected portion of the system will fall outside of the operating range of the relay. Upon the occurrence of a fault, on the other hand, the apparent impedance of the protected circuit portion will instantly change to a value which will cause the relay to operate. Conventional distance relays are not wholly satisfactory, however, because the apparent impedance of the system may also change as the result of power swings, which are surges of power in the electrical system resulting from the removal of a fault from the system but external to the protected circuit, or from the loss of synchronism between a generator and the system.

It is an object of the invention to provide a new and improved distance type relay.

It is another object of the invention to provide a distance type relay which is not responsive to power swings.

A further object of the invention is to provide a distance type relay whose reach is not affected by the magnitude of the fault resistance.

Another object of the invention is to provide a distance type relay having a characteristic which closely resembles the actual zone into which the apparent impedance of the system moves upon the occurrence of a fault.

A more specific object of the invention is to provide a distance type relay having a first circuit means for producing first and second pairs of electrical signals each having a phase relation functionally related to the system voltage and current wherein one pair of signals is modified relative to the other pair thereof and including phase sensing circuit means for producing an output function when the pairs of electrical signals have predetermined phase relationships.

These and other objects and advantages of the instant invention will become more apparent from the detailed description thereof, taken with the accompanying drawings, in which:

FIG. 1 is a graphical representation on an impedance diagram of the operating characteristics of prior art distance type relays;

FIG. 2 schematically illustrates one embodiment of the distance type relay according to the instant invention;

FIGS. 3–7 are graphical representations, in terms of impedance, of the development of the operating characteristic of the distance relay illustrated in FIG. 2;

FIG. 8 illustrates an alternate embodiment of the instant invention; and

Figure 2:
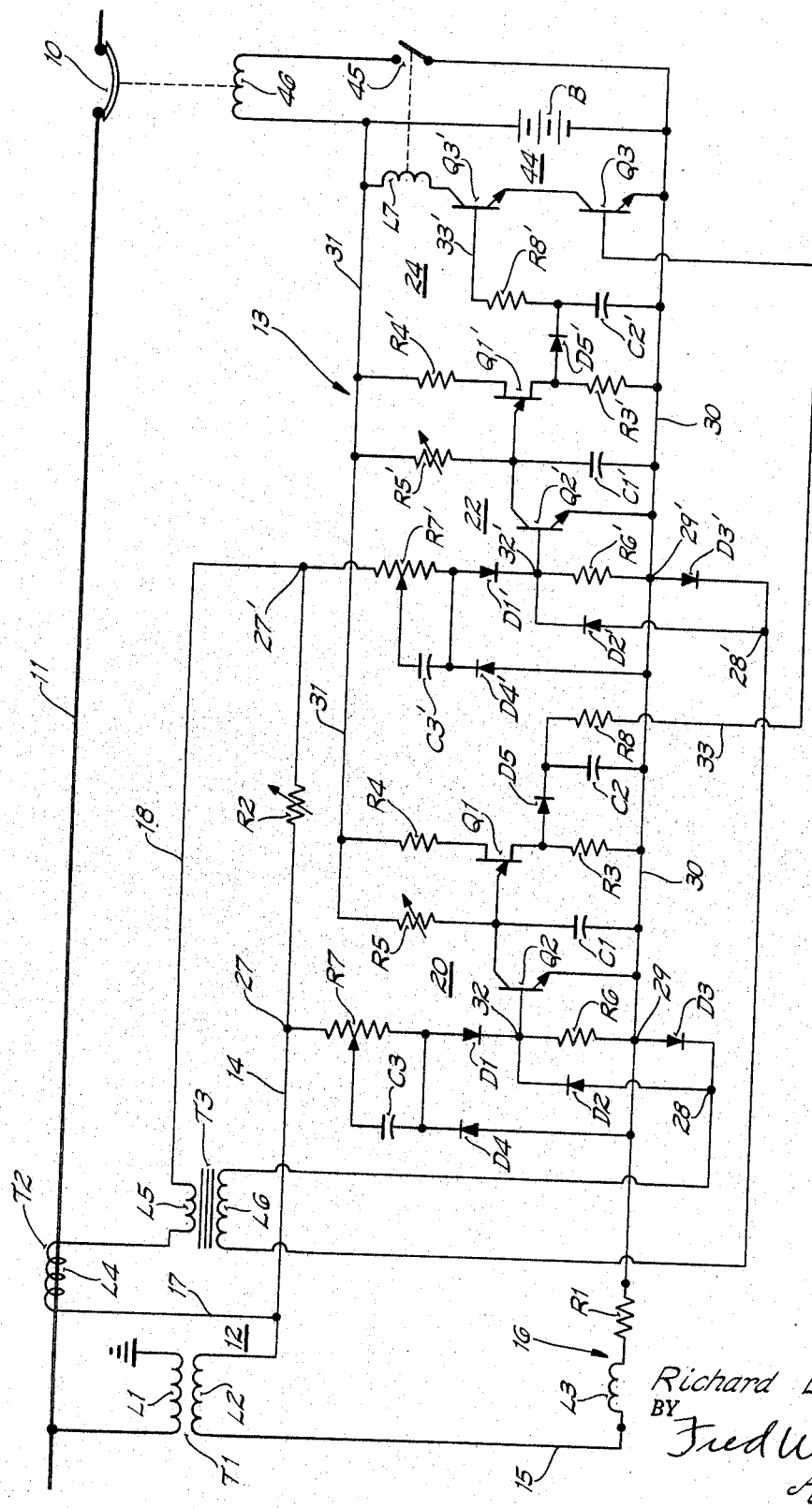

FIGS. 9 and 10 graphically illustrate the development of the characteristic of the distance relay illustrated in FIG. 8.

Referring now to the drawings in greater detail, FIG. 1 represents the operating characteristic of a conventional distance relay on an impedance diagram. The origin O of the impedance diagram represents the location of the distance relay, while the abscissa R and the ordinate X are respectively the values of resistance and inductive reactance as determined by the vectorial relationship between system voltage and current measured at the distance relay. The impedance of the power line being protected, as viewed from the origin, is represented by the line L. The circle Z represents the locus of impedance values which define the operating limits of a typical distance relay. Under normal operating conditions, the apparent impedance of the line being protected, as viewed from the distance relay, will fall outside of the circle Z, so that the impedance relay will not operate. Upon the occurrence of a fault, on the other hand, the apparent impedance of the protected line will change to some value within the circle Z, causing the distance relay to operate.

The intersection A, between the apparent impedance OL of the line L and the characteristic Z of the conventional distance relay, is defined as the reach of the distance relay. In other words, any fault occurring in the line L between the origin O and a point OA distance therefrom should cause the distance relay to operate.

However, upon the occurrence of a fault, the apparent impedance seen by the relay at the origin O will not only include the impedance of the line L from the origin to the point of the fault, but also an additional impedance equal to the fault resistance. As a result, the apparent impedance actually seen by the distance relay is the vector sum of the line impedance from the origin to the point of the fault plus the fault resistance. It can therefore be seen that the possible locus of apparent impedances seen by the distance relay located at the origin O with respect to the line portion OA is defined by a parallelogram having one side lying upon the line characteristic and having a length equal to the impedance between the origin O and the end A of the line being protected. A second side of the parallelogram will be parallel to the R axis of the impedance diagram and have a length equal to the maximum possible fault resistance AB, while the other two sides of the parallelogram EB and OE will be parallel to the lines OA and AB, respectively.

The area within the parallelogram OABE is the actual fault zone F of the line L. Thus, the apparent impedance of a fault on line L between the origin O and the point A will lie within the parallelogram F and its position will depend upon the distance from the origin O and the magnitude of the fault resistance. It can be seen from FIG. 1 that a substantial area of the characteristic Z of conventional distance relays is external of the fault zone F. It can also be seen from FIG. 1 that the reach of conventional distance relays will vary with the magnitude of the fault resistance. Thus, with zero fault resistance the reach of conventional distance relays is to the point A. On the other hand, with maximum fault resistance the reach is reduced to the point D because the characteristic Z intersects the maximum resistance line BE of the fault zone F at point G.

Referring now to FIG. 2, the distance relay according to the instant invention is shown to include interrupter switches 10 in circuit with the line 11 being protected, an input circuit 12 and a control circuit 13. Input circuit 12 is coupled to the line 11 being protected and provides the control circuit 13 with first and second pairs of electrical signals having the same phase relationship as the voltage and current flowing in the line 11. The control circuit 13 is responsive to a predetermined phase relationship between these electrical signals to provide an output signal for opening the interrupting switches 10 when the apparent impedance of the line 11 falls within the fault zone F.

The input circuit 12 includes a potential transformer T1, whose primary winding L1 is connected across the line 11 for deriving a secondary voltage in winding L2 which is functionally related to the voltage in line 11. One end of secondary winding L2 is connected to a common conductor 14, while the other end thereof is connected by conductor 15 to one end of a phase shifting network 16 consisting of a conductor L3 and a resistor R1 connected in series.

The input circuit 12 also includes a current transformer T2 whose secondary winding L4 is conductively coupled to line 11 for deriving a secondary current proportional to and having the same phase relationship relative to the voltage in the secondary winding L2 of transformer T1 as the current and voltage values in the line 11. One end of winding L4 of transformer T2 is connected by conductor 17 to the common conductor 14 and its other end is connected to one end of the primary winding L5 of a second current transformer T3. The other end of winding L5 is connected by conductor 18 to one end of a resistor R2, the other end of which is connected to the common conductor 14.

The control circuit 13 includes a first phase angle sensing circuit 20, a second phase angle sensing circuit 22 and an output circuit 24. The phase angle sensing circuits 20 and 22 respectively have a voltage input terminal 27 and 27', a current input terminal 28 and 28' and a common terminal 29 and 29' for receiving corresponding electrical signals from the input circuit 12.

More specifically, the alternating voltage signal which is induced in the secondary winding L2 of transformer T1, is applied through the phase shifting circuit 16 to the first phase angle sensing circuit 20 through terminals 27 and 29. In addition, the voltage signal is applied to the second phase angle sensing circuit 22 through inputs 27' and 29' but this signal is modified by vectorially subtracting a voltage equal to the drop across R2 produced by the current in the secondary winding L4 of current transformer T2, which current is functionally related to line current.

The alternating current signal induced in the secondary winding L6 of current transformer T3 is applied to the first phase angle sensing circuit 20 through terminals 28 and 29 and to the second phase angle sensing circuit 22 through terminals 28' and 29'. However, because terminals 28 and 28' are connected to the opposite ends of winding L6, the alternating current signals applied to each are 180° out of phase.

The phase angle sensing circuits 20 and 22 are identical so that corresponding parts of each will be designated by the same reference numerals with the components of the second sensing circuit 22 being distinguished by a prime ('). Also, because the phase angle sensing circuits 20 and 22 are identical, only circuit 20 will be discussed in detail for the sake of brevity.

Power is supplied to the circuits 20 and 22 through conductors 30 and 31 which are respectively connected to the negative and positive terminals of a unidirectional source symbolized by a battery B.

The first phase angle sensing circuit 20 includes a unijunction transistor Q1 whose base-one electrode is connected through resistor Q3 to the negative power supply conductor 30 and whose base-two electrode is connected through resistor R4 to the positive power supply conductor 31. A capacitor C1 is connected between the emitter electrode of Q1 and conductor 30 and an adjustable resistor R5 is connected between said emitter electrode and conductor 31. The emitter-collector circuit of an NPN transistor Q2 shunts capacitor C1 while the base of Q2 is connected to the junction 32 between the series combination of a resistor R6 and a diode D1. An adjustable resistor R7 is also connected in series with diode D1 and the combination is connected between terminals 27 and 29.

A pair of diodes D2 and D3 connect the current signal input terminal 28 to resistor R6 to provide unipolarity current flow through resistor R6. A third diode D4 shunts the resistor R6 and the diode D1 and a capacitor C3 is connected between the diode D1 and the wiper of the adjustable resistor R7.

The base-one electrode of unijunction transistor Q1 is connected by a diode D5 to one side of a resistor R8, the other side of which is connected by conductor 33 to the output circuit 24. Also, a capacitor C2 is connected between diode D5 and the negative supply conductor 30.

When the transistor Q1 is nonconductive, capacitor C1 will receive charging current from conductors 30 and 31 and through resistor R5. After capacitor C1 has charged for a predetermined length of time, the emitter of unijunction transistor Q1 will become forward biased and emitter-base-one current will flow through resistor R3. This produces an output signal through diode D5 to charge capacitor C2. The potential across capacitor C2 applied through resistor R8 and conductor 33 comprises an output signal to the output circuit 24. The time required for capacitor C1 to charge to the potential required to forward bias the emitter of unijunction Q1 will depend upon the resistance of adjustable resistor R5.

It will be appreciated that the voltage in the input terminal 27 will alternate as the potential in the line 11 alternates. When the potential in terminal 27 is positive, current will flow through resistor R7, diode D1, and resistor R6. As a result, transistor Q1 will be forward biased to short circuit capacitor C1. In a similar manner, the current signal in input terminal 28 will alternate as the current in the line 11 alternates. When the current signal at terminal 28 is positive, current will flow through diode D2, resistor R6, to forward bias transistor Q2 and short circuit capacitor C1. It can thus be seen that capacitor C1 will be short circuited whenever either the voltage at terminal 27 or the current at terminal 28 is positive. Conversely, capacitor C1 can charge only when both the voltage at terminal 27 and the current at terminal 28 are negative. Accordingly, an output signal is produced only if the voltage at terminal 27 and the current at terminal 28 are both negative for a period equal to or longer than the time required for capacitor C1 to charge to the potential required to forward bias the emitter of Q1.

Assume, for example, that in order to reach the required potential, capacitor C1 must charge for a period of $29/72$ of a cycle. Assume, further, with reference to FIG. 3, that the current vector I leads the voltage vector V by an angle of $\pm \theta$. As a result, the voltage V and the current I will both be negative for $180° - \theta$. Since $29/72$ of a cycle is required for the capacitor C1 to become charged to the desired potential, an output signal will be produced whenever $180° - \theta$ is equal to or greater than $29/72$ of a cycle or $\theta$ is equal to 35° or less. Thus, if the effect of capacitor C3 and the phase shifting circuit 16 are neglected in the illustrated example, the first phase angle sensing circuit 20 will have the characteristic 40 plotted on the impedance diagram of FIG. 4, wherein an output signal will be provided whenever the angle between voltage and current is equal to or less than the angle $\pm \theta$.

It can be seen that when capacitor C3 and phase shifting circuit 16 are neglected, the characteristic 40 of the angle sensing circuit 20 is symmetrical with respect to the R axis of the impedance diagram of FIG. 4. The capacitor C3 of FIG. 2 is provided for rotating this characteristic through an angle $-\beta$ as shown in FIG. 5. Capacitor C3, which is connected to the wiper of resistor R7, shifts the phase of the current flowing from conductor 14 through diode D1 and the base emitter circuit of transistor Q2. As a result, the entire characteristic angle of the first angle sensing circuit 20 is rotated about its apex through the angle $-\beta$. Thus, neglecting the phase shifting circuit 16, angle sensing circuit 20 will have the characteristic 40 shown by full lines in FIG. 5 wherein an output signal will be produced whenever the angle between the voltage at terminal 27 and the current at terminal 28 is equal to $(\theta - \beta)$ or $-(\theta + \beta)$. The angle $\beta$ can be adjusted by moving the wiper of resistor R7 to vary the impedance angle of the parallel combination of R7 and C3.

As stated hereinabove, the second phase angle sensing circuit 22 is identical with the phase angle sensing circuit 20. As a result, capacitor C1′ will charge whenever the voltage signal at terminal 27′ and the current signal at terminal 28′ are both negative. However, because resistor R2 is connected between conductor 14 and terminal 27′, the voltage input signal to the second phase angle sensing circuit 22 will be the vector sum of the line voltage signal at the terminals 27–29 and −IR2 where I is the current induced in the secondary winding L4 of current transformer T2 and which is functionally related to line current. For this reason, the characteristic 42 of the second phase angle sensing circuit 22 will be displaced a distance R7 on the R axis of the impedance diagram as seen in FIG. 6. In addition, because terminals 29 and 29′ are connected to the opposite sides of secondary winding L6 of transformer T3, the current input signal to the second phase angle sensing circuit 22 will be 180° out of phase with the current signal to the first phase angle sensing circuit 20. This has the effect of reversing the direction of characteristic 42 of the second phase angle sensing circuit 22 as seen in FIG. 6.

In the foregoing development of the characteristics of the phase angle sensing circuits 20 and 22, the effect of the phase shifting circuit 16 has been neglected. It will be appreciated that if the combined characteristic of FIG. 6 is rotated through the angle α, as seen in FIG. 7, it can be made to correspond to the fault zone shown in FIG. 1. This rotation of the characteristics 40 and 42 is obtained by placing the phase shifting circuit 16 in the voltage supply circuit for each of the angle sensing circuits 20 and 22. In this manner, the characteristic of each circuit is shifted from the R axis and about the origin through the angle α. By a proper selection of L3 and R1, the combined and shifted characteristics 40 and 42 of the phase angle sensing circuits 20 and 22 can be made to correspond to the fault zone F.

It can be seen that when the characteristics 40 and 42 are combined in a single RX diagram as shown in FIGS. 6 and 7, they form a parallelogram. Referring again to FIG. 2, the characteristics 40 and 42 of each of the phase angle sensing circuits 20 and 22 are combined by means of an AND logic circuit 44 which includes a first NPN transistor Q3 whose emitter is connected to the negative power supply conductor 30 and whose collector is connected to the emitter of a second NPN transistor Q3′. The collector of Q3′ is connected to one side of relay coil L7, the other side of which is connected to the positive battery supply conductor 31. The base of Q3 is connected to the base-one electrode of unijunction transistor Q1 through conductor 33, resistor R8 and diode D5, while the base of Q3′ is similarly connected to the base-one electrode of Q1′ through conductor 33′, resistor R8′ and diode D5′.

It will be appreciated that when the emitter of unijunction transistor Q1 of the first phase angle sensing circuit 20 is forward biased, a signal will be passed to the base of transistor Q3, so that Q3 will be forward biased. As a result, transistor Q3 will be forward biased when the vector relationship between the voltage and current in line 11 has a predetermined value within the limits given by the characteristic 40 of the first phase angle sensing circuit 20 as seen in FIG. 7. Similarly, when the emitter of unijunction transistor Q1′ is forward biased, a signal will be passed to the base of transistor Q3′ through diode D5′, resistor R8′ and conductor 33′. Thus, transistor Q3′ will be forward biased when the vector relationship between the voltage and current in line 11 has a predetermined value within the limits given by the characteristic 42 of the second phase angle sensing circuit 22, as seen in FIG. 7.

When each of the transistors Q3 and Q3′ are conductive, relay coil L7 will be energized to close its contacts 45 and energize a trip solenoid 46 which, in turn, effects the opening of the circuit breaker contacts 10 in any manner well known in the art. It will thus be appreciated that by combining the characteristic 40 from the first phase angle sensing circuit 20 and the characteristic 42 in the second phase angle sensing circuit 22 in the AND logic circuit 44, the combined relay characteristic seen in FIG. 7 is obtained. As a result, the circuit breaker interrupting contacts 10 will be opened whenever the vector relationship between the voltage and current in line 11 falls within this combined characteristic. By a proper selection of components, this characteristic can be made to correspond to the fault zone F illustrated in FIG. 1.

From the foregoing, it will be appreciated that the relay, according to the instant invention, has a characteristic trip zone which corresponds to the actual fault zone of the line being protected. Thus, tripping will occur only if the system operating point actually moves within the fault zone. In addition, the reach of the relay is completely independent of the magnitude of the fault resistance.

In the alternate embodiment of the invention illustrated in FIG. 8, the input circuit 12 is modified so that the desired characteristic is obtained in a different manner. In each of the phase angle sensing circuits 20 and 22 of the embodiment of FIG. 8, the capacitor C3 of FIG. 2 is replaced by an adjustable inductance L8 connected in series with the resistor R7. It will be recalled with respect to the embodiment of FIG. 2 that capacitor C3 performed the function of shifting the characteristic 40 of the phase angle sensing circuit 20 through an angle of −β. In the embodiment of FIG. 8, the inductor L8 performs the function of shifting the characteristic through an angle of +λ. By a proper selection of components the characteristic 50 of the first phase angle sensing circuit 20 of FIG. 8 can be made to correspond to the load line L and the R axis of the impedance diagram of FIG. 9, which also corresponds to one pair of sides of the parallelogram defining the fault zone F.

The embodiment of FIG. 8 is additionally modified by connecting an inductive reactance L9 in series with the adjustable resistor R2. It will be recalled with respect to the embodiment of FIG. 2 that the resistor R2 performed the function of offsetting the characteristic of the second phase angle sensing circuit 22 a distance R2 on the R axis as illustrtaed in FIG. 6. The insertion of the inductive reactance L9 in esries with resistor R2 causes the characteristic 42 of the second phase angle sensing circuit 22 to be offset a distance Z along a line rotated from the R axis through $$\tan^{-1}\frac{\omega L9}{R2}$$

By a proper selection of R2 and L9, the characteristic 52 of the second phase angle sensing circuit 22 can be offset along the line in the first quadrant of the impedance diagram of FIG. 9 which is α degrees from the R axis. As a result, the characteristic 52 will lie along a second pair of sides of the parallelogram defining the fault zone F.

While only two embodiments of the invention have been shown and described, it is not intended to be limited thereby but only by the scope of the appended claims.

I claim:

1. A distance relay for protecting an alternating current electric system, input circuit means coupled to said system for producing first and second pairs of alternating voltage and current signals each having a phase relation functionally related to that of the voltage and current in said system, said input circuit means being constructed and arranged to offset the voltage signal of said second pair of signals relative to the voltage signal in said first pair of signals and to phase modify the current signal of said second pair of signals relative to the current signal of said first pair of signals, phase sensing circuit means coupled to said input circuit means for receiving each of said pairs of electrical signals and being constructed and arranged to produce an output signal when said first pair of electrical signals has a predetermined phase relation and when said second pair of modified electrical signals has a predetermined phase relation, said input circuit means modifying said second pair of alternating voltage and current signals in a manner to provide said phase sensing circuit means with a characteristic which, when plotted on an impedance diagram, forms an acute angle opening toward the origin of said diagram and wherein one side is substantially parallel to the R axis of said diagram and the other side is generally parallel to the line on said diagram representative of the impedance of said system, and output circuit means connected to said phase sensing circuit means for performing an output function upon the occurrence of said output signal.

2. A distance relay for protecting an alternating current electric system, input circuit means coupled to said system for producing a pair of electrical signals having a phase relation functionally related to the voltage and current in said system, a first phase sensing circuit means coupled to said input circuit means for receiving said pair of signals and being constructed and arranged to produce a first output signal when said input signals have a predetermined phase relation, modifying circuit means connected to said input circuit means for offsetting one of said pair of signals and for phase modifying the other of said pair of signals, a second phase sensing circuit means connected to said modifying circuit means for receiving said modified pair of electrical signals, said second phase sensing circuit means being constructed and arranged to produce a second output signal when said pair of modified signals have a predetermined phase relation, said modifying circuit means modifying said pair of signals in a manner to provide said second phase sensing circuit means with a characteristic which, when plotted on an impedance diagram, forms an acute angle opening toward the origin of said diagram and wherein one side is substantially parallel to the R axis thereof and the other side is generally parallel to the line on said diagram representative of the impedance of said system, electroresponsive means, output circuit means connected to each of said first and second phase sensing circuit means for energizing said electroresponsive means upon the occurrence of each of said first and second output signals.

3. A distance relay for protecting an alternating current electric system, input circuit means coupled to said system for producing a voltage and a current signal having the same phase relation as the voltage and current in said system, a first phase sensing circuit means coupled to said input circuit means for receiving said signals and being constructed and arranged to produce a first output signal when said voltage and current signals have a predetermined phase relation, modifying circuit means connected to said input circuit means for current modifying said voltage signal and for reversing said current signal, a second phase sensing circuit means connected to said modifying circuit means for receiving said modified voltage and current signals, said second phase sensing circuit means being constructed and arranged to produce a second output signal when said pair of modified voltage and current signals have a predetermined phase relation, said modifying circuit means modifying said voltage and current signals in a manner to provide said second phase sensing circuit means with a characteristic which, when plotted on an impedance diagram, forms an acute angle opening toward the origin of said diagram wherein one side is substantially parallel to the R axis of said diagram and the other is substantially parallel to the line on said diagram representative of the impedance of said system, output circuit means including AND circuit means connected to each of said first and second phase sensing circuit means for producing an output function upon the occurrence of each of said first and second output signals.

4. A distance relay for protecting an alternating current electric system, input circuit means coupled to said system for producing first and second electrical input signals having a phase relation functionally related to that of the voltage and current in said system, said input circuit means including a first circuit means for phase shifting one of said signals, a first phase sensing circuit coupled to said input circuit means for receiving input signals and for producng a first output signal when said input signals have a first predetermined relation, a second phase sensing circuit, said input circuit means shifting said one signal in a manner to provide said first phase sensing circuit with a characteristic which, when plotted on an impedance diagram, forms an angle whose apex is at the origin of said diagram and which is at least equal to the angle that the line representing the system impedance makes with the R axis of said diagram, a second phase sensing circuit, coupling circuit means in circuit between said second phase angle sensing circuit and said input circuit for offsetting one of said input signals and for reversing the other of said input signals, said second phase sensing circuit being constructed and arranged to produce a second output signal when said offset signal and said reversed signal have a predetermined phase relation, the offsetting and reversing of said signals by said coupling circuit means being operative to provide said second phase sensing circuit with a characteristic which forms an acute angle opening toward the origin of said diagram and wherein one side is substantially parallel to said R axis and the other side intersects said R axis at an angle no greater than the angle that said system impedance representative line forms with said R axis and output circuit means connected to each of said first and second phase sensing circuits for performing an output function upon the occurrence of said first and second output signals.

5. A distance relay for protecting an alternating current electric system, first circuit means coupled to said system for producing alternating voltage and current signals having the same phase relationship as the voltage and current in said system, impedance means connected to said first circuit means for phase modifying said voltage signal, a first phase sensing circuit having first and second inputs coupled to said impedance means and said first circuit means for respectively receiving said phase modified voltage signal and said current signal, said impedance means modifying said voltage signal in such a manner that said first phase sensing circuit is provided with a characteristic which, when plotted on an impedance diagram, forms an angle whose apex is at the origin of said diagram and which is at least equal to the angle between a line representing the system impedance on said diagram with the R axis thereof, a second phase sensing circuit having third input coupled to said first circuit means for receiving said voltage signal and a fourth input, coupling circuit means in circuit between said third input and said first circuit means for receiving said current signal and including impedance means for offsetting said voltage signal, said coupling circuit means also including means for phase modifying said current representative signal and for applying said phase modified current signal to said fourth input, each of said first and second phase sensing circuits being operative to produce an output signal when the phase angle between the voltage and current applied to its inputs has a preselected value, the offsetting and modifying of said signals by said coupling circuit means being operative to provide said second phase sensing circuit with a characteristic on said diagram which forms an acute angle opening toward the origin thereof and wherein one side is substantially parallel to the R axis and the other side intersects said R axis at an angle which is no greater than the angle that said system impedance representative line forms with said R axis and an output circuit connected to each of said first and second phase angle sensing circuits for performing an output function upon the occurrence of an output signal in each of said first and second phase angle sensing circuits.

6. A distance relay for protecting an alternating current electric system, first circuit means coupled to said system for producing alternating voltage and current representative electrical signals having a phase relationship functionally related to that of the voltage and current in said system, a first phase sensing circuit having a first pair of inputs each coupled to said first circuit means for receiving said voltage and current representative signals, a second phase sensing circuit having a second pair of inputs, coupling circuit means in circuit between said second pair of inputs and said first circuit means and including means for modifying said voltage and current representative signals, each of said second pair of inputs being connected to said coupling circuit means for receiving said modified voltage and current representative signals, each of said first and second phase sensing circuits including electrical signal polarity responsive means connected to its respective inputs for producing an output signal when each of the signals applied thereto has a given polarity for a predetermined period, phase shifting circuit means including impedance means in circuit with each of said first and second pair of inputs to modify the phase of the voltage representative signal applied to each of said first and second phase sensing circuits, an output circuit including AND circuit means connected to each of said first and second phase sensing circuits for performing an output function when said AND circuit means receives said first and second output signals.

7. A distance relay for protecting an alternating current electric system, first circuit means coupled to said system for producing alternating voltage and current signals having the same phase relationship as the voltage and current in said system, a first phase sensing circuit having first and second inputs coupled to said first circuit means for respectively receiving said voltage and current signals, a second phase sensing circuit having a third input coupled to said first circuit means for receiving said voltage signal and a fourth input, coupling circuit means in circuit between said third input and said first circuit means for receiving said current signal and including impedance means for offsetting said voltage signal, said coupling circuit means also including means for reversing the phase of said current representative signal and for applying said reversed signal to said fourth input, each of said first and second phase sensing circuits including signal polarity responsive means connected to its respective inputs for producing an output signal when each of the signals applied thereto has a given polarity for a predetermined period, resistive and reactive impedance means in circuit with each of said first and third inputs to modify the phase of the voltage representative signal applied to each of said first and second phase sensing circuits, an output circuit including AND circuit means connected to each of said first and second phase angle sensing circuits for performing an output function when said AND circuit means receives said first and second output signals.

8. A distance relay for protecting an alternating current electric system whose locus of impedances can be represented by a straight line lying in the first quadrant of an impedance diagram wherein said relay lies at the origin of said diagram, input circuit means coupled to said system for producing alternating voltage and current signals having a phase relationship functionally related to the voltage and current in said system, first phase sensing circuit means coupled to said input circuit means for receiving said voltage and current signals and for producing a first output signal when said signals have a predetermined phase relation to provide a characteristic on said impedance diagram comprising an angle having its apex at the origin thereof, second phase sensing circuit means, coupling circuit means in circuit between said input circuit means and said phase sensing circuit means for modifying said voltage and current signals, said second phase sensing circuit being constructed and arranged to produce a second output signal when the modified voltage and current representative signals have a predetermined phase relation to provide a characteristic on said phase diagram comprising an acute angle whose apex is displaced from said origin and which opens toward said origin, an output circuit connected to each of said first and second phase angle sensing circuits for performing an output function when said output circuit receives said first and second output signals to provide a combined quadrilateral characteristic for said relay.

9. A distance relay for protecting an alternating current electric system whose locus of impedances can be represented by a straight line lying in the first quadrant of an impedance diagram wherein said relay lies at the origin of said diagram, first circuit means coupled to said system for producing alternating voltage and current signals having the same phase relationship as the voltage and current in said system, a first phase sensing circuit having first and second inputs coupled to said first circuit means for respectively receiving said voltage and current signals, said first phase sensing circuit being operative to produce a first output signal when said signals have a predetermined phase relation to provide a characteristic on said impedance diagram comprising an angle having its apex at the origin thereof, a second phase sensing circuit having a third input coupled to said first circuit means for receiving said voltage signal and a fourth input, coupling circuit means in circuit between said third input and said first circuit means for receiving said current signal and including impedance means for offsetting said voltage signal, said coupling circuit means also including means for reversing the phase of said current signal and for applying said reversed signal to said fourth input, said second phase sensing circuit being constructed and arranged to produce a second output signal when the signals applied to said third and fourth inputs have a predetermined phase relation to provide a characteristic on said phase diagram comprising an angle whose apex is displaced from said origin and which opens toward said origin, impedance means in circuit with each of said first and third inputs to modify the phase of the voltage signal applied to each of said first and second phase sensing circuits to move the characteristic of each into the first quadrant of said phase diagram, and an output circuit including AND circuit means connected to each of said first and second phase angle sensing circuits for performing an output function when said AND circuit means receives said first and second output signals to provide a combined quadrilateral characteristic for said relay.

10. A distance relay for protecting an alternating current system, first and second transformer means coupled to said system for respectively producing alternating voltage and current signals having a phase relation corresponding to that of the voltage and current in said system, first impedance means coupled to said first transforming means and including resistive and reactive components, a first phase sensing circuit having a first input coupled to said first impedance means for receiving said voltage signal and a second input coupled to said second transforming means for receiving said current signal, second impedance means coupled to said second transforming means including at least a resistive component, a second phase sensing circuit having a first input coupled to said first and second impedances for receiving a modified voltage signal and a second input coupled to said second transforming means for receiving a reversed current signal, each of said first and second phase sensing circuits having an output and being constructed and arranged to produce an output signal when the signals applied to its inputs have a given polarity for a predetermined period, an output circuit including AND circuit means connected to the output of each of said first and second phase sensing circuits for performing an output function when said AND circuit means receive said first and second output signals.

11. A distance relay for protecting an alternating current system, first and second transformer means coupled to said system for respectively producing alternating voltage and current signals having a phase relation corresponding to that of the voltage and current in said system, first impedance means coupled to said first transformer means and including resistive and inductive components, a first phase sensing circuit having a first input coupled to said first impedance means for receiving said voltage signal and a second input coupled to one side of said second transformer means for receiving said current signal, second impedance means coupled to said first transformer means including at least a resistive component, a second phase sensing circuit having a first input coupled to said first and second impedances for receiving a current modified voltage signal and a second input coupled to the opposite side of said second transformer means for a reversed current signal, each of said first and second phase sensing circuits including signal polarity responsive means connected to its respective inputs for producing an output signal when each of the signals applied thereto has a given polarity for a predetermined period, an output circuit including AND circuit means connected to each of said first and second phase angle sensing circuits for performing an output function when said AND circuit means receives said first and second output signals.

12. The distance relay set forth in claim 13 and including second phase sensing circuit means coupled to said input circuit means and to said shifting circuit means for receiving said signals for providing an output signal when said signals have a predetermined phase relation, said shifting circuit means also shifting said signals in a manner to provide said second phase sensing circuit with an angular characteristic having its apex at the origin of said diagram and which intercepts the other characteristic to provide said distance relay with a quadrilateral characteristic.

13. A distance relay for an alternating current electric system, said relay having an operating characteristic when plotted on an impedance diagram, input circuit means coupled to said system for producing voltage and current representative input signals having a phase relation functionally related to that of the voltage and current in said system, shifting circuit means coupled to said input circuit means for shifting said input signals in a predetermined manner, phase sensing circuit means coupled to said shifting circuit means for receiving said shifted signals and for providing an output signal when said signals have a predetermined phase relation, said shifting circuit means shifting said signals in a manner to provide said phase sensing circuit with a characteristic which forms an acute angle opening toward the origin of said diagram and wherein one side is substantially parallel to said R axis and the other side is generally parallel to the line on said diagram representative of the transmission line impedance, and output circuit means connected to said phase sensing circuit means for performing an output function upon the occurrence of said output signals.

14. The distance relay set forth in claim 13 wherein said shifting circuit means shifts one of said signals and offsets one of said signals.

15. The distance relay set forth in claim 13 wherein said shifting circuit means includes impedance means for offsetting said voltage representative signal and for reversing one of said signals.

16. The distance relay set forth in claim 13 wherein said shifting circuit means reverses said current representative signal and includes impedance means for offsetting said voltage representative signal.

17. A distance relay for an alternating current electric system and having a quadrilateral characteristic when plotted on an impedance diagram, input circuit means coupled to said system for producing first and second pairs of electrical input signals each having a phase relation functionally related to that of the voltage and current in said system, shifting circuit means coupled to said input circuit means for receiving said input signals and for respectively shifting said first and second pairs of input signals in a first and second predetermined manner, first phase sensing circuit means coupled to said shifting circuit means for receiving said first pair of modified signals for providing an output signal when said first pair of modified signals has a predetermined phase relation, said shifting circuit means shifting said first pair of signals in a manner to provide said first phase sensing circuit with a characteristic which forms an angle whose apex is at the origin of said diagram and which is at least equal to the angle the line representing the transmission line impedance makes with the R axis of said diagram, and a second phase sensing circuit means coupled to said shifting circuit means for providing an output signal when said second pair of phase modified electrical signals has a predetermined phase relation, said shifting circuit means shifting said second pair of signals in a manner to provide said second phase sensing circuit with a characteristic which forms an acute angle opening toward the origin of said diagram and wherein one side is substantially parallel to said R axis and the other side is generally parallel to the line on said diagram representative of the transmission line impedance, and output circuit means connected to said phase sensing circuits for performing an output function upon the occurrence of said output signals to provide said rectangular characteristic.

18. The distance relay set forth in claim 17 wherein said shifting circuit means shifts one of said second pair of signals and includes impedance means for offsetting one of said second pair of signals.

19. The distance relay set forth in claim 18 wherein said shifting circuit means offsets the voltage representative signal of said second pair of said signals and reverses one of said second pair of signals.

20. The distance relay set forth in claim 19 wherein said shifting circuit means reverses the current representative signal of said second pair of signals and includes impedance means for offsetting said second voltage representative signal, said shifting circuit means also phase shifting the voltage representative signal of each pair.

References Cited
UNITED STATES PATENTS

| | | | |
|---|---|---|---|
| 2,845,581 | 7/1958 | Hodges et al. | 317—36 |
| 2,879,454 | 3/1959 | Hodges et al. | 317—36 X |
| 2,922,109 | 1/1960 | Hodges et al. | 317—36 X |
| 2,969,485 | 1/1961 | Goff | 317—36 |
| 3,048,744 | 8/1962 | Warrington | 317—27 |
| 3,163,802 | 12/1964 | Seguin et al. | 317—36 |

MILTON O. HIRSHFIELD, *Primary Examiner.*

R. V. LUPO, *Assistant Examiner.*

UNITED STATES PATENT OFFICE
CERTIFICATE OF CORRECTION

Patent No. 3,340,434            September 5, 1967

Richard E. Riebs

It is hereby certified that error appears in the above numbered patent requiring correction and that the said Letters Patent should read as corrected below.

Column 10, line 10, strike out "angle"; column 12, line 50, for the claim reference numeral "19" read -- 17 --.

Signed and sealed this 15th day of October 1968.

(SEAL)
Attest:

Edward M. Fletcher, Jr.
Attesting Officer

EDWARD J. BRENNER
Commissioner of Patents